United States Patent

[11] 3,625,948

[72] Inventor Jorg Haberli
 Warwick, R.I.
[21] Appl. No. 738,853
[22] Filed June 21, 1968
[45] Patented Dec. 7, 1971
[73] Assignee Geigy Chemical Corporation
 Ardsley, N.Y.

[54] PROCESS FOR THE PREPARATION OF HEXAHYDROMETHANOBENZAZOCINES
 4 Claims, No Drawings

[52] U.S. Cl. .................................................. 260/293.94,
 260/293 A, 260/294.3 R, 260/294.3 M
[51] Int. Cl. ..................................................... C07d 39/00
[50] Field of Search ............................................ 260/553,
 294 A

[56] References Cited
 UNITED STATES PATENTS
 2,882,273 4/1959 Holdrege ..................... 260/294

OTHER REFERENCES

Erickson, J. Am. Chem. Soc. 76, 3977– 8 (1954).
Houben-Weyl, " Methoder der Organischen Chemie," Band XI/1, Georg Thieme Verlag, Stuttgart (1957), p. 948.
Reference Cited by Applicant: Davis et al., J. Am. Chem. Soc. 45, 1816– 20 (1923).
Krumbiegel et al., Kernenergie 5 (4– 5), 359– 61 (1962). (supplied earlier)

*Primary Examiner*—John D. Randolph
*Assistant Examiner*—G. Thomas Todd
*Attorneys*—Karl F. Jorda, Bruce M. Collins and Martin J. Spellman, Jr.

ABSTRACT: 3-carbamyl-1,2,3,4,5,6-hexahydro-2,6-methano-3-benzazocines are prepared from the corresponding 3-unsubstituted compounds by treatment with urea.

PROCESS FOR THE PREPARATION OF HEXAHYDROMETHANOBENZAZOCINES

The present invention pertains to the preparation of 3-carbamyl-1,2,3,4,5,6-hexahydro-2,6-methano-3-benzazocines of the formula:

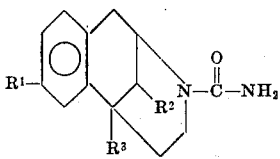

(I)

wherein $R^1$ is hydrogen, hydroxy or (lower)alkoxy;
$R^2$ is hydrogen or (lower)alkyl; and
$R^3$ is hydrogen, (lower)alkyl, β-methoxyethyl or

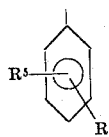

wherein each of $R^6$ and $R^5$ is hydrogen, halogen, (lower)alkyl, (lower)alkoxy, hydroxy or trifluoromethyl.

The above ureas are known analgesics and antitussive agents, being described for example in U.S. Pat. No. 3,341,538. The known preparations of these ureas as described therein include treatment of urethane with an amine, hydrolysis of a cyanamide, or conversion of a thiourea with mercuric oxide. All of these routes, while suitable for small scale synthesis, suffer in large-scale production from one or more disadvantages of expensive reagents or intermediates, potentially hazardous conditions or reagents, inadequate yields or complexity of the reaction sequence.

The present process is easily and safely practiced, employs inexpensive reagents and produces yields in order of magnitude of 90 percent or more. According to this process, a 3-unsubstituted 1,2,3,4,5,6-hexahydro-2,6-methano-3-benzazocine of the formula:

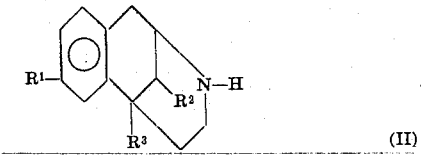

(II)

wherein $R^1$, $R^2$ and $R^3$ are as previously defined, is treated with urea ($NH_2CONH_2$) under simple aqueous conditions. The reaction is conducted by simply mixing the compound of formula II, generally as a salt such as the hydrochloride, with at least a molar equivalent amount, generally a molar excess, of urea. If the free base of formula II is used, about a molar equivalent, e.g., from 0.5 to 1.5, of acid should be added. The reactants are heated at a temperature of from about 50° C. to reflux, preferably above 70° C. for a period of from about 4 to about 15 hours. The product is insoluble in the reaction medium and can be readily collected by filtration and purified according to conventional techniques, e.g., solvent extraction, recrystallization or the like.

The secondary amines of formula II are well known, being described in U.S. Pat. No. 3,320,265 issued May 16, 1967. They are therein prepared for example through reduction of a 3-cyanobenzazocine as with lithium aluminum hydride, the 3-cyano-3-benzazocine being obtained via the action of cyanogen bromide on a 3-methyl-3-benzazocine. In accordance with a second aspect of the present invention, however, compounds of formula II are prepared in high yield from a urethane of formula III:

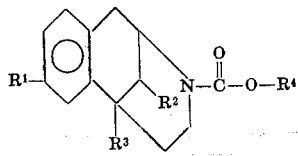

(III)

wherein $R^1$, $R^2$ and $R^3$ are as defined above, and
$R^4$ is (lower)alkyl of up to 6 carbon atoms or phenyl.

Urethanes of formula III are thus treated preferentially with an excess of metal hydroxide such as potassium hydroxide, sodium hydroxide, barium hydroxide or the like in a high-boiling solvent such as ethylene glycol, ethyl cellosolve, diglyme, triglyme or the like. The reaction is executed at a temperature of from about 80° C. to about 150° C. and is complete in from about 1 to about 10 hours. The product is isolated by simply adjusting the pH of the reaction medium to from about 9.5 to about 10, and collecting the solid product.

The known urethanes of formula III are readily obtained from 3-methyl-1,2,3,4,5,6-hexahydro-2,6-methano-3-benzazocines through the use of a mixed anhydride such as ethyl chloroformate or phenyl chloroformate, as is described for example in U.S. Pat. No. 3,341,538.

The foregoing process for the preparation of compounds of formula II is particularly well suited for use in conjunction with the process for the preparation of 3-carbamyl-1,2,3,4,5,6-hexahydro-2,6-methano-3-benzazocines with urea. Thus such 3-carbamyl compounds can be readily prepared in good yields through a three-step synthesis from the known 3-methyl compound without the need for such reagents as cyanogen bromide and hydrogen peroxide which were employed in prior art methods. The process is particularly valuable for the preparation of compounds wherein $R^1$ is hydrogen, hydroxy or methoxy, $R^2$ is hydrogen or methyl and $R^3$ is phenyl, e.g., for the preparation of 3-carbamyl-6-phenyl-8-hydroxy-1,2,3,4,5,6-hexahydro-2,6-methano-3-benzazocine.

The following examples will serve to further typify the practice of the present invention, but should not be construed as a limitation thereof.

EXAMPLE 1

8-Acetoxy-3-carbethoxy-1,2,3,4,5,6-hexahydro-6-phenyl-2,6-methano-3-benzazocine

To a solution of 230 g. of 8-acetoxyl-1,2,3,4,5,6-hexahydro-3-methyl-6phenyl-2,6-methano-3-benzazocine in 470 ml. of dry toluene are added 194 g. of ethyl chloroformate over 1 hour at 80° C. The mixture is held at 80° C. for 6 hours, after which 60 g. of water are added. The lower aqueous layer is separated and the organic layer is washed several times with dilute hydrochloric acid, followed by water. The toluene solution is heated and the solvent removed by distillation. At 120° C. vacuum is applied. To the melt are added 470 ml. of isopropanol and upon cooling the resulting solution, the product crystallizes. It is isolated by filtration and washed with isopropanol. Drying under reduced pressure leaves 211.5 g. of the desired product, m.p. 119°–121° C.

EXAMPLE 2

1,2,3,4,5,6-Hexahydro-6-phenyl-2,6-methano-3-benzazocine-8-ol

To 127 ml. of ethyl carbitol are added 50 g. of 8-acetoxy-3-carbethoxy-1,2,3,4,5,6-hexahydro-6-phenyl-2,6-methano-3-benzazocine and 52 g. of 90 percent potassium hydroxide. The solution is held at 150° C. for 4 hours and a 13 percent aqueous ammonium chloride solution is carefully added in order to adjust the pH to 9.5–10.0. The solids are isolated by filtration and washed with 790 ml. of water, followed by 195 ml. of acetone. The dry product weighs 30.5 g., m.p. 242°–244° C.

EXAMPLE 3

3-Carbamyl-1,2,3,4,5,6-hexahydro-6-phenyl-2,6-methano-3-benzazocine-8-ol

A mixture composed of 256 g. of water, 24.2 g. of 37 percent hydrochloric acid, 1.8 g. of glacial acetic acid, 54 g. of urea and 60 g. of 1,2,3,4,5,6-hexahydro-6-phenyl-2,6-methano-3-benzazocine-8-ol is held at approximately 100° C. for 8 hours. Four hundred and fifty grams of hot water are added slowly. One hour thereafter the solids are isolated by filtration and washed with 1,800 g. of hot water. Drying under reduced pressure leaves 66 g. of the desired product, m.p. 295°–296° C.

EXAMPLE 4

The following compounds are subjected to the procedure of example 2:
8-acetoxy-3-carbethoxy-6-(p-chlorophenyl)-1,2,3,4,5,6-hexahydro-2,6-methano-3-benzazocine;
b-1. 3-carbethoxy-6-(3,4-dimethoxyphenyl)-8-methoxy-1,2,3,4,5,6-hexahydro-2,6-methano-3-benzazocine;
c-1. 3-carbethoxy-6-(β-methoxyethyl)-1,2,3,4,5,6-hexahydro-2,6-methano-3-benzazocine;
d-1. 8-acetoxy-3-carbophenoxy-6-phenyl-1,2,3,4,5,6-hexahydro-2,6-methano-3-benzazocine.

There are thus respectively obtained the following compounds:
a-2. 6-(p-chlorophenyl)-1,2,3,4,5,6-hexahydro-2,6-methano-3-benzazocine-8-ol;
b-2. 6-(3,4-dimethoxyphenyl)-8-methoxyl-1,2,3,4,5,6-hexahydro-2,6-methano-3-benzazocine.
c-2. 6-(β-methoxyethyl)-1,2,3,4,5,6-hexahydro-2,6-methano-3-benzazocine.
d-2. 6-phenyl-1,2,3,4,5,6-hexahydro-2,6-methano-3-benzazocine-8-ol.

Upon treatment of these compounds with urea according to the procedure of example 3, the following products are respectively obtained:
a-3. 3-carbamyl-6-(p-chlorophenyl)-1,2,3,4,5,6-hexahydro-2,6-methano-3-benzazocine-8-ol. m.p. 170°–177° C.
b-3. 3-carbamyl-6-(3,4-dimethoxyphenyl)-8-methoxy-1,2,3,4,5,6-hexahydro-2,6-methano-3-benzazocine.
c-3. 3-carbamyl-6-(β-methoxyethyl)-1,2,3,4,5,6-hexahydro-2,6-methano-3-benzazocine, m.p. 141°–142° C.
d-3. 3-carbamyl-6-phenyl-1,2,3,4,5,6-hexahydro-2,6-methano-3-benzazocine-8-ol. m.p. 292°–294° C.

EXAMPLE 5

By following the procedure of example 3 but omitting the acetic acid and substituting an equimolar amount (e.g., 0.0567 moles of free base to 0.06 mole of acid) of methanesulfonic acid and trichloro acetic acid, the same product is obtained in yields of 94.5 and 92 percent respectively.

In a similar fashion concentrated sulfuric acid and oxalic acid may be utilized, the concentration being 0.0567 moles of base to 0.03 mole of acid.

What is claimed is:
1. Process for the preparation of a 3-carbamyl-1,2,3,4,5,6-hexahydro-2,6-methano-3-benzazocine of the formula:

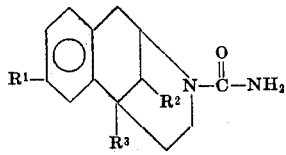

wherein $R^1$ is hydrogen, hydroxy or (lower)alkoxy;
$R^2$ is hydrogen or (lower)alkyl; and
$R^3$ is hydrogen, (lower)alkyl, β-methoxyethyl, or the group

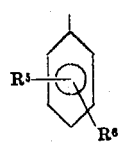

wherein each of $R^6$ and $R^5$ is hydrogen, halogen, (lower)alkyl, (lower)alkoxy, hydroxy or trifluoromethyl, which comprises
a. heating a 3-carbalkoxy-1,2,3,4,5,6-hexahydro-2,6-methano-3-benzazocine of the formula:

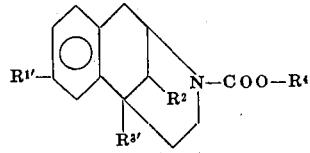

wherein $R^{1'}$ is hydrogen, hydroxy, (lower)alkoxy or (lower)alkanoyloxy;
$R^2$ is as defined above;
$R^{3'}$ is hydrogen, (lower)alkyl, β-methoxyethyl or

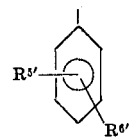

wherein each of $R^{5'}$ and $R^{6'}$ is hydrogen, halogen, (lower)alkyl, (lower)alkoxy, hydroxy, trifluoromethyl or (lower)alkanoyloxy; and
$R^4$ is (lower)alkyl or phenyl,
with a molar excess of a metal hydroxide in an inert organic solvent for from 1 to 10 hours to yield a 3-unsubstituted-1,2,3,4,5,6-hexahydro-2,6-methano-3-benzazocine of the formula:

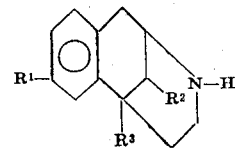

wherein each of $R^1$, $R^2$ and $R^3$ is as defined above; and
b. treating said 3-unsubstituted-1,2,3,4,5,6-hexahydro-2,6-methano-3-benzazocine with at least a molar equivalent amount of urea in an aqueous acidic medium.

2. The process according to claim 1 wherein $R^{1'}$ is hydrogen, hydroxy, methoxy or acetoxy, $R^2$ is hydrogen or methyl, and $R^{3'}$ is phenyl, (a) the 3-carbalkoxy-1,2,3,4,5,6-hexahydro-2,6-methano-3-benzazocine being treated with a molar excess of sodium hydroxide or potassium hydroxide in a high-boiling organic solvent at a temperature of about 150° C. to yield the corresponding 3-unsubstituted-1,2,3,4,5,6-hexahydro-2,6-methano-3-benzazocine wherein $R^1$ is hydrogen, hydroxy or methoxy and $R^2$ is hydrogen or methyl; and (b) the 3-unsubstituted-1,2,3,4,5,6-hexahydro-2,6-methano-3-benzazocine thus obtained being heated with at least a molar equivalent amount of urea in an aqueous acidic medium at about 100° C.

3. The process according to claim 2 wherein the 3-carbalkoxy-1,2,3,4,5,6-hexahydro-2,6-methano-3-benzazocine is treated with a molar excess of potassium hydroxide in a high-boiling ether solvent.

4. Process for the preparation of 3-carbamyl-6-phenyl-8-hydroxyl-1,2,3,4,5,6-hexahydro-2,6-methano-3-benzazocine which comprises heating 3-carbethoxy-6-phenyl-8-acetoxy-1,2,3,4,5,6-hexahydro-2,6-methano-3-benzazocine or 3-carbophenoxy-6-phenyl-8-acetoxy-1,2,3,4,5,6-hexahydro-2,6-methano-3-benzazocine with a molar excess of potassium hydroxide so as to form 6-phenyl-8-hydroxy-1,2,3,4,5,6-hexahydro-2,6-methano-3-benzazocine and treating said 6-phenyl-8-hydroxy-1,2,3,4,5,6-hexahydro-2,6-methano-3-benzazocine with at least a molar equivalent amount of urea in an aqueous acidic medium about 100° C.

* * * * *